United States Patent
Paffrath

(10) Patent No.: US 9,695,781 B2
(45) Date of Patent: Jul. 4, 2017

(54) VALVE SYSTEM FOR INTERNAL COMBUSTION ENGINES

(71) Applicant: PIERBURG GMBH, Neuss (DE)

(72) Inventor: Holger Paffrath, Pulheim (DE)

(73) Assignee: PIERBURG GMBH, Neuss (DE)

( * ) Notice: Subject to any disclaimer, the term of this patent is extended or adjusted under 35 U.S.C. 154(b) by 61 days.

(21) Appl. No.: 14/526,537

(22) Filed: Oct. 29, 2014

(65) Prior Publication Data

US 2015/0114502 A1    Apr. 30, 2015

(30) Foreign Application Priority Data

Oct. 31, 2013 (DE) ................. 10 2013 112 018

(51) Int. Cl.
  *F02M 26/66* (2016.01)
  *F16K 11/04* (2006.01)
  *F02M 25/07* (2006.01)

(52) U.S. Cl.
  CPC ........ *F02M 25/0788* (2013.01); *F02M 26/66* (2016.02); *F16K 11/04* (2013.01); *Y10T 137/86879* (2015.04)

(58) Field of Classification Search
  CPC ... F02M 25/0788; F16K 11/04; Y02T 10/121; Y10T 137/86879
  USPC ...................................... 137/625.4
  See application file for complete search history.

(56) References Cited

U.S. PATENT DOCUMENTS

| 3,115,892 | A | * | 12/1963 | Brewer | G05D 7/0126 137/501 |
| 7,918,241 | B1 | * | 4/2011 | Chang | F16K 11/074 137/315.09 |
| 8,869,816 | B2 | * | 10/2014 | Chang | F16K 11/0787 137/100 |
| 2003/0160199 | A1 | | 8/2003 | Bareis et al. | |
| 2008/0135026 | A1 | | 6/2008 | Okada et al. | |
| 2008/0216469 | A1 | | 9/2008 | Beck et al. | |
| 2009/0205729 | A1 | * | 8/2009 | Wears | F16K 11/044 137/625.4 |
| 2014/0060686 | A1 | * | 3/2014 | Kemp | F16K 3/08 137/625.17 |

FOREIGN PATENT DOCUMENTS

| DE | 102 07 922 A1 | 9/2003 |
| DE | 10 2005 044 088 A1 | 3/2007 |
| DE | 10 2006 024 728 A1 | 11/2007 |
| DE | 10 2008 027 490 A1 | 12/2009 |

* cited by examiner

*Primary Examiner* — Michael R Reid
*Assistant Examiner* — Patrick Williams
(74) *Attorney, Agent, or Firm* — Norman B. Thot

(57) ABSTRACT

A valve system for an internal combustion engine includes a housing, a drive unit arranged in the housing, at least one valve unit, at least two gas inlet ducts, and a gas outlet duct. The at least one valve unit comprises at least one valve rod, at least one valve closure body, and at least one valve seat. The at least one valve unit is connected to the drive unit. The at least two gas inlet ducts form exactly one of the at least one valve seat which is configured to cooperate with exactly one of the at least one valve closure body.

14 Claims, 5 Drawing Sheets

VALVE SYSTEM FOR INTERNAL COMBUSTION ENGINES

CROSS REFERENCE TO PRIOR APPLICATIONS

Priority is claimed to German Patent Application No. DE 10 2013 112 018.0, filed Oct. 31, 2013. The entire disclosure of said application is incorporated by reference herein.

FIELD

The present invention relates to a valve system for an internal combustion engine, in particular, for exhaust gas recirculation, comprising a housing in which a drive unit is arranged that, in terms of drive, is connected with at least one valve unit, and further comprising at least two gas inlet ducts and one gas outlet duct, the valve unit comprising at least one valve rod, at least one valve closure body, and at least one valve seat.

BACKGROUND

Such valve systems have previously been described. DE 10 2008 027 490 A1, for example, describes a valve system in which two gas inlet ducts are connected with an outlet duct for exhaust gas recirculation. The two gas inlet ducts each have a valve seat that can be closed with a valve closing body of the respective valve. Both valves are driven by a common drive unit. The separation of the gas inlet ducts is particularly important in the high-pressure EGR area to avoid negative effects on the gas dynamics in the exhaust gas system and the turbocharger. It should be understood, however, that although only one drive unit is used, two independent valves must basically be provided for two gas inlet ducts, which must also be securely coupled with the drive unit via a transmission system, thereby causing considerable assembly effort and high costs.

SUMMARY

An aspect of the present invention is to provide a valve system which allows for a simple and economic separation of the gas inlet ducts.

In an embodiment, the present invention provides a valve system for an internal combustion engine which includes a housing, a drive unit arranged in the housing, at least one valve unit, at least two gas inlet ducts, and a gas outlet duct. The at least one valve unit comprises at least one valve rod, at least one valve closure body, and at least one valve seat. The at least one valve unit is connected to the drive unit. The at least two gas inlet ducts form exactly one of the at least one valve seat which is configured to cooperate with exactly one of the at least one valve closure body.

BRIEF DESCRIPTION OF THE DRAWINGS

The present invention is described in greater detail below on the basis of embodiments and of the drawings in which.

DETAILED DESCRIPTION

In an embodiment, the present invention provides that the gas inlet ducts form exactly one valve seat which cooperates with exactly one valve closure body. In this manner, it is possible to manufacture a valve system having a plurality of gas inlet ducts and one gas outlet duct in a particularly simple and economic manner. The complex transmission structure of the prior art which couples the two individual valves can be omitted without substitution. It may be particularly advantageous in this regard if, for example, the valve seat of the gas inlet ducts comprises a molded-in seat ring.

In an embodiment of the present invention, the gas inlet ducts can, for example, be separated from each other by at least one web element. The valve seat can, for example, be formed by a circumferential wall section of the gas inlet ducts that is directed towards the gas outlet duct. The web element can, for example, end a short distance from the valve closure body. It is thereby provided that the valve closure body is not over-determined when resting on the valve seat. With a narrow gap of a dimension of $2/10$ mm, for example, the mutual influence among the gas inlet ducts is very little or negligible. The valve rod can, for example, additionally be provided with a sealing element at the end facing the valve seat, which sealing element engages the web element. The sealing element and the web element can, for example, be designed as a tongue-and-groove system. The sealing element can alternatively be made from spring steel.

In an embodiment of the present invention, the valve body can, for example, be supported at the valve rod in a resilient manner, whereby a sealed contact of the valve closure body with the valve seat is provided in a simple manner.

The present invention is explained hereinafter in greater detail under reference to the drawings.

Figure 1:
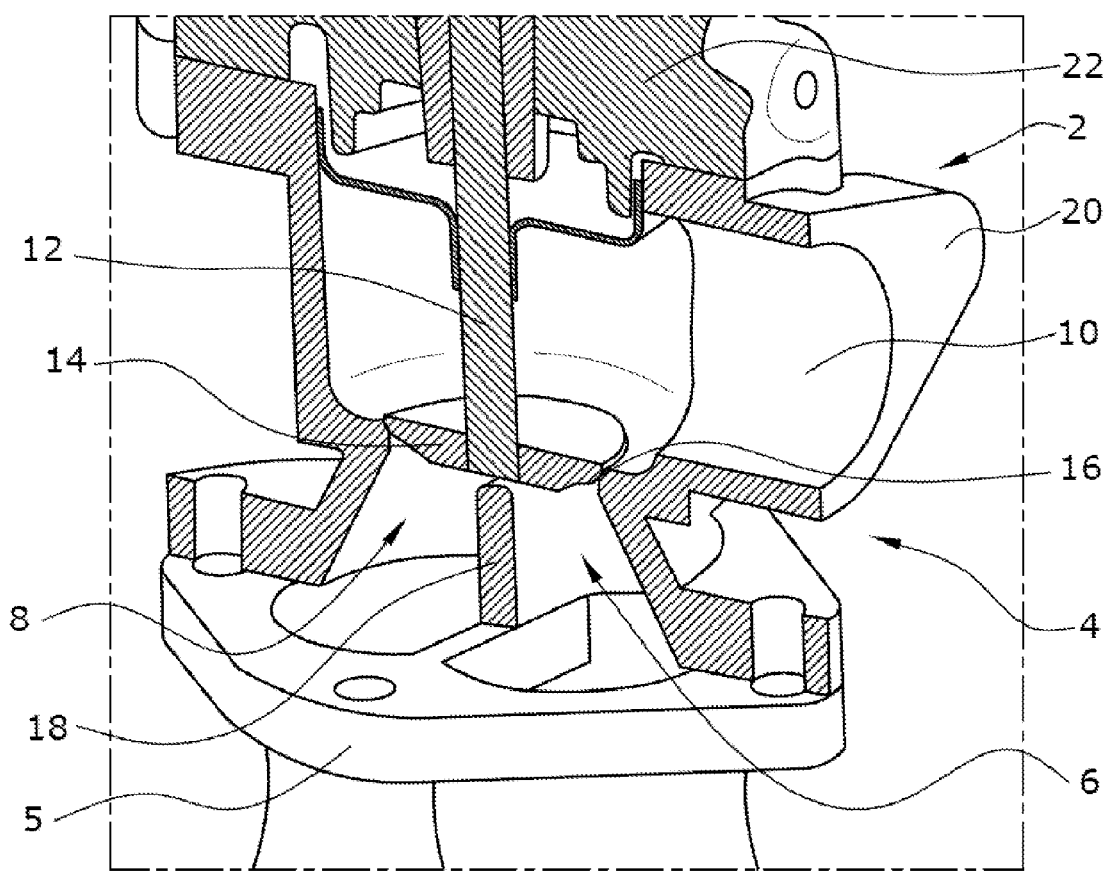
FIG. 1 shows a sectional perspective view of a valve system according to the present invention.

FIG. 1 shows a perspective sectional view of a detail of a valve system 2 for internal combustion engines for exhaust gas recirculation purposes. The valve system 2 has a multi-part housing 4 which, in the present embodiment, is connected with a two-channel exhaust gas line 5. It should be understood that the housing 4 can also be designed as a single-piece housing. The exhaust gas line 5 may further have a different design; in particular, it may have more than two exhaust gas channels. The multi-part housing 4 in the present case is built from a first housing part 20 and a second housing part 22, wherein a drive unit (not illustrated in detail) is provided in the second housing part 22. Two gas inlet ducts 6, 8 separated by a web element 18 are provided in the first housing part 20, which ducts communicate with a gas outlet duct 10 in the open state of a valve unit. The valve unit has a valve rod 12 and a valve closure body 14 which cooperates with a valve seat 16 in a manner known per se. The valve closure body 14 can be supported resiliently on the valve rod 12 in order to provide a secure abutment of the valve closure body 14 on the valve seat 16. The valve seat 16 of the gas inlet ducts 6, 8 can have a molded-in seat ring (not illustrated in the drawings). The valve seat 16 is formed by a circumferential wall section 17 of the gas inlet ducts 6, 8 that is directed towards the gas outlet duct 10 (shown in FIG. 2).

Figure 2:
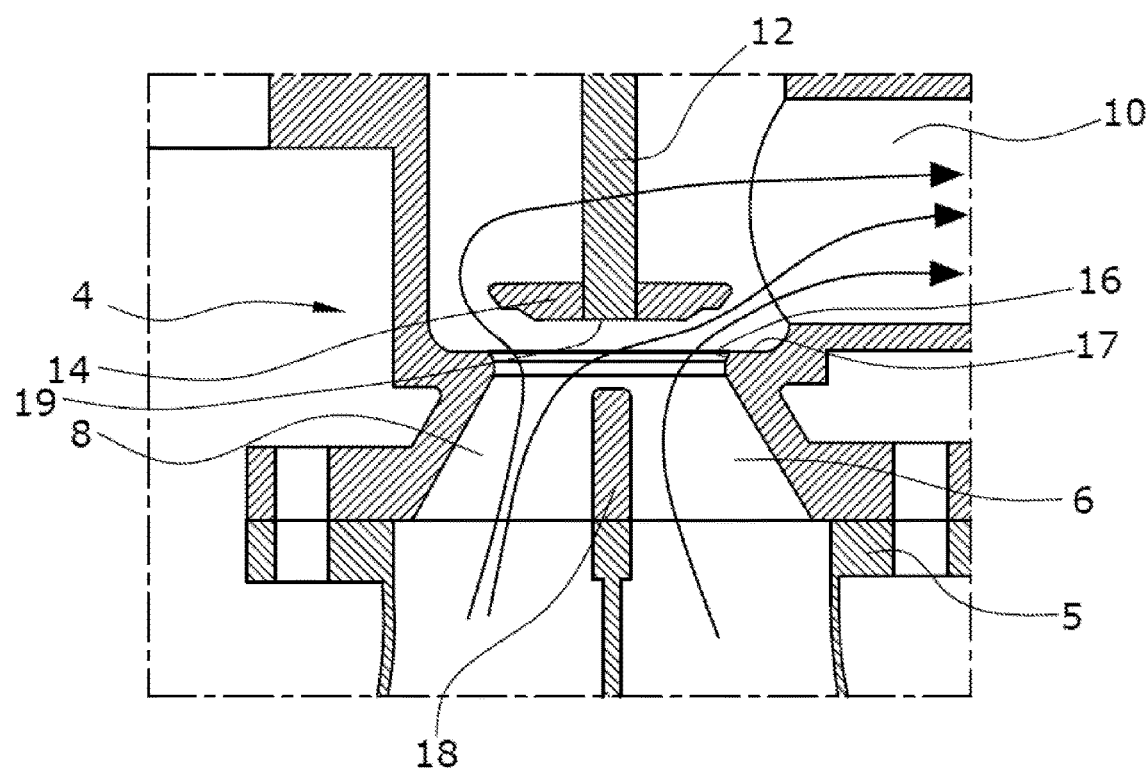
FIG. 2 shows a cross-sectional view of the valve system in FIG. 1 with the valve unit open.
Figure 3:
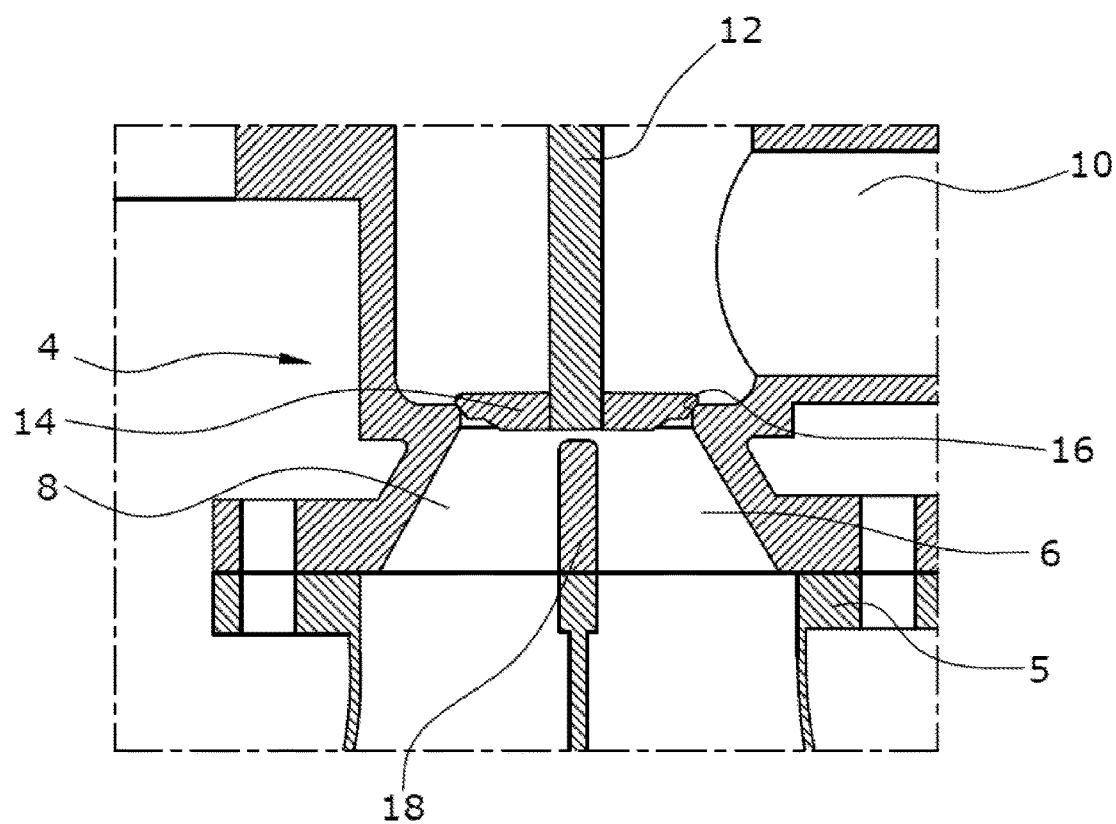
FIG. 3 shows a cross-sectional view of the valve system in FIG. 1 with the valve unit closed.
Figure 4:
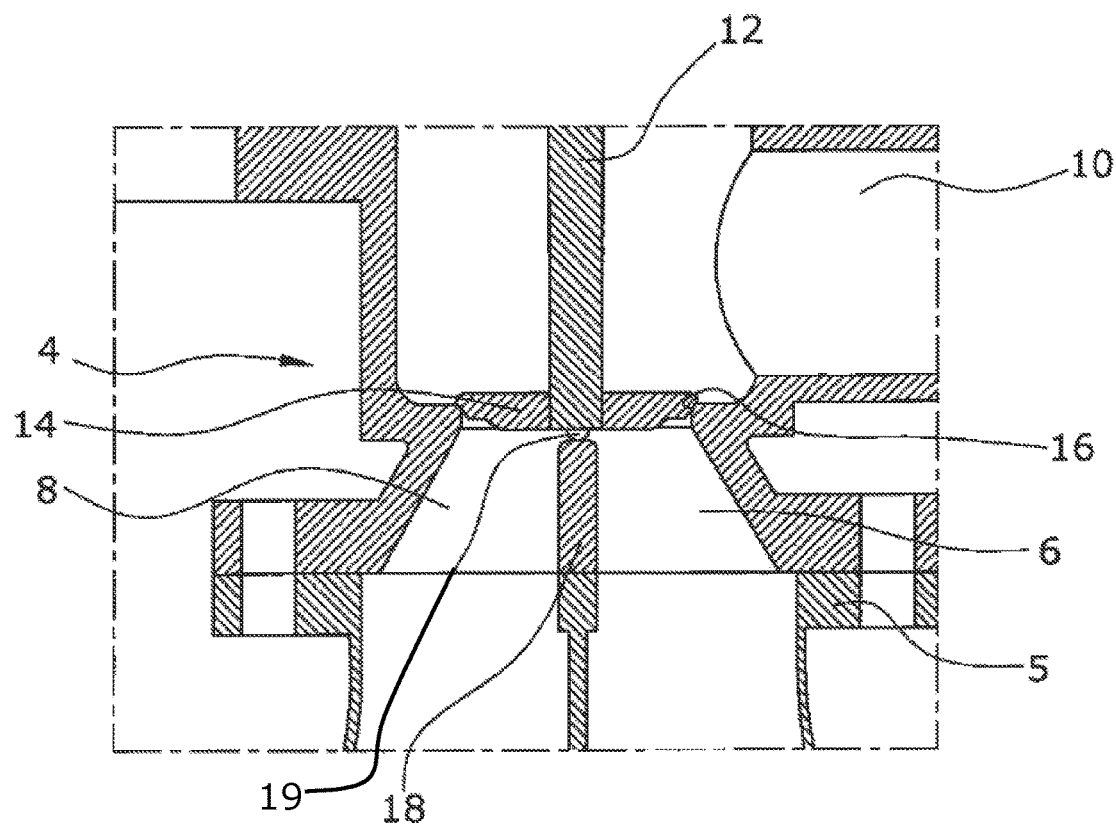
FIG. 4 shows a cross-sectional view of the valve system in FIG. 1 with the valve unit closed where the sealing element is shown to abut on the web element.
Figure 5:
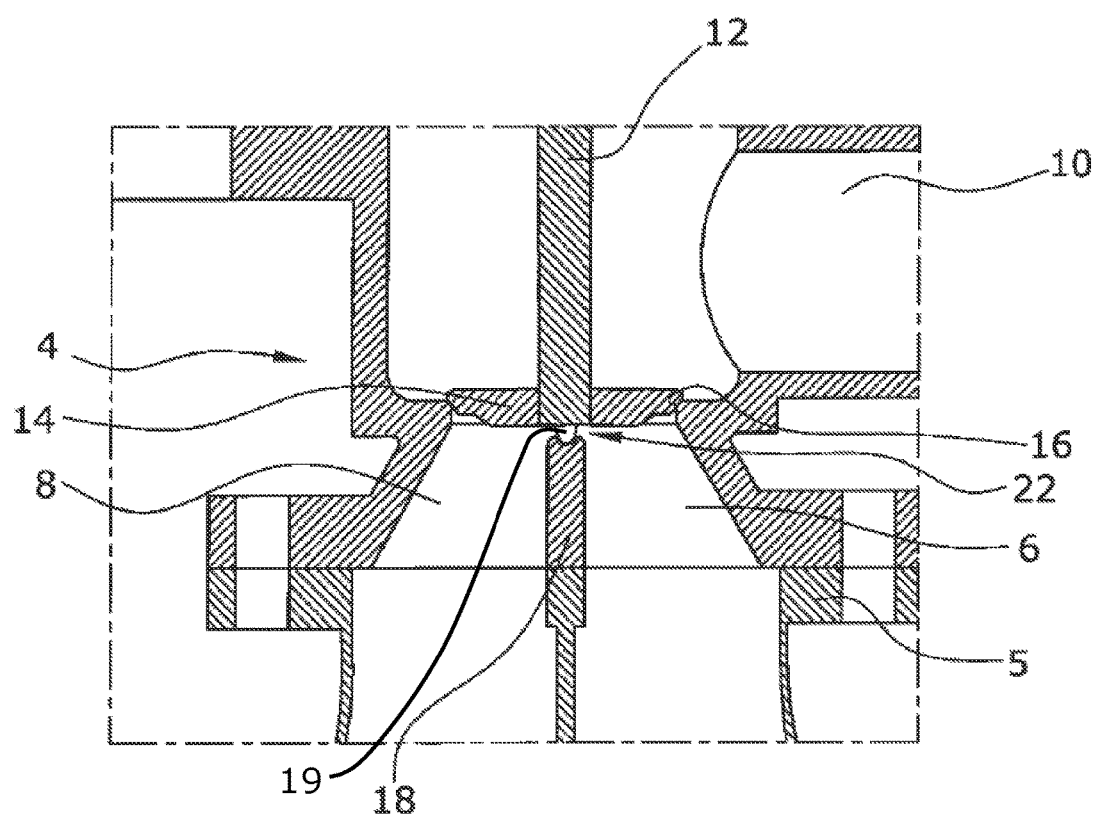
FIG. 5 shows a cross-sectional view of the valve system in FIG. 1 with the valve unit closed where the sealing element is shown as a tongue-and-groove system which abuts on the web element.

As is clearly visible in particular in FIG. 3, the web element 18 ends a short distance from the valve closure body 14, whereby, in the shown embodiment, a sufficient separation of the gas inlet ducts 6, 8 is provided and an over-determination of the abutment of the valve closure body 14 is prevented in a particularly simple and economic manner. It is also conceivable, however, to provide a sealing element 19 at the valve rod 12 or at the valve closure body 14, respectively, which abuts on the web element 18 in a sealing manner (see FIG. 2). It is conceivable in this context, for example, to use a tongue-and-groove system as the sealing element 19. The sealing element 19 can further be made from spring steel. The sealing element 19 can in this case be an integral part of the valve rod 12, however, it may also be designed as an individual part. It is also conceivable to manufacture the valve rod 12 or the valve closure body 14 from stainless steel.

FIG. 2 shows a sectional view of the valve system 2 in the open position of the valve closure body 14. The arrows show a possible exhaust gas flow from the gas inlet ducts 6, 8 into the gas outlet duct 10.

FIG. 3 shows the valve system 2 with the valve closure body closed, wherein the small distance of the web element 18 to the valve closure body 14 or the valve rod 12, respectively, provides a sufficient separation of the gas inlet ducts 6, 8. It should be clear based on FIG. 3 that a complete sealed separation of the gas inlet ducts 6, 8 can be achieved in a simple manner by using a corresponding sealing element 19 on the valve closure body 14 or the valve rod 12. In the context of the possibilities mentioned before, it is also conceivable to provide the side of the valve rod 12 directed towards the web element 18 with a corresponding shape that could engage the web element 18 as the sealing element.

The present invention is not limited to embodiments described herein; reference should be had to the appended claims.

What is claimed is:

1. A valve system for an internal combustion engine, the valve system comprising:
    a housing;
    a drive unit arranged in the housing;
    at least one valve unit comprising at least one valve rod, exactly one valve closure body, and exactly one valve seat, the at least one valve unit being connected to the drive unit;
    at least two gas inlet ducts each of which are configured to be connected to a respective exhaust gas flow; and
    a gas outlet duct; and at least one web element, the at least two gas inlet ducts being separated from each other by the at least one web element, wherein, the at least two gas inlet ducts form the exactly one valve seat which is configured to cooperate the with the exactly one valve closure body, and
    the at least one valve rod comprises a sealing element at an end directed to the exactly one valve seat, the sealing element being configured to engage the at least one web element, the sealing element and the at least one web element are configured as a tongue-and-groove system, and
    the at least one valve rod is configured to move up and down so that the exactly one valve closure body cooperates with the exactly one valve seat.

2. The valve system as recited in claim 1, wherein the valve system is provided for exhaust gas recirculation.

3. The valve system as recited in claim 1, wherein the exactly one valve seat comprises a molded-in seat ring.

4. The valve system as recited in claim 1, wherein, in a closed state of the exactly one valve closure body, the at least one web element is configured to end before the exactly one valve closure body.

5. The valve system as recited in claim 1, wherein the at least two gas inlet ducts comprise a circumferential wall section, the circumferential wall section being directed to the gas outlet and being configured to form the exactly one valve seat.

6. The valve system as recited in claim 1, wherein the sealing element comprises spring steel.

7. The valve system as recited in claim 1, wherein the exactly one valve closure body is configured to be resiliently supported at the at least one valve rod.

8. A valve system for an internal combustion engine, the valve system comprising:
    a housing;
    a drive unit arranged in the housing;
    exactly one valve unit comprising exactly one valve rod, exactly one valve closure body, and exactly one valve seat, the exactly one valve unit being connected to the drive unit;
    at least two gas inlet ducts each of which are configured to be connected to a respective exhaust gas flow; and
    a gas outlet duct; and at least one web element, the at least two gas inlet ducts being separated from each other by the at least one web element, wherein, the at least two gas inlet ducts form the exactly one valve seat which is configured to cooperate with the exactly one valve closure body, and
    the exactly one valve rod comprises a sealing element at an end directed to the exactly one valve seat, the sealing element being configured to engage the at least one web element, the sealing element and the at least one web element are configured as a tongue-and-groove system, and
    the exactly one valve rod is configured to move up and down so that the exactly one valve closure body cooperates with the exactly one valve seat.

9. The valve system as recited in claim 8, wherein the valve system is provided for exhaust gas recirculation.

10. The valve system as recited in claim 8, wherein the exactly one valve seat comprises a molded-in seat ring.

11. The valve system as recited in claim 8, wherein, in a closed state of the exactly one valve closure body, the at least one web element is configured to end before the exactly one valve closure body.

12. The valve system as recited in claim 8, wherein the at least two gas inlet ducts comprise a circumferential wall section, the circumferential wall section being directed to the gas outlet and being configured to form the exactly one valve seat.

13. The valve system as recited in claim 8, wherein the sealing element comprises spring steel.

14. The valve system as recited in claim 8, wherein the exactly one valve closure body is configured to be resiliently supported at the exactly one valve rod.

\* \* \* \* \*